(12) United States Patent
Xu et al.

(10) Patent No.: US 12,373,463 B2
(45) Date of Patent: Jul. 29, 2025

(54) METHOD AND SYSTEM FOR AUTOMATIC DELETION OF INFORMATION BASED ON TIME SYNCHRONIZATION AND TRUSTED COUNTING

(71) Applicant: Huazhong University of Science and Technology, Wuhan (CN)

(72) Inventors: Peng Xu, Wuhan (CN); Yinjia Pi, Wuhan (CN); Wei Wang, Wuhan (CN); Shuning Xu, Wuhan (CN); Yubo Zheng, Wuhan (CN); Hai Jin, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 18/631,790

(22) Filed: Apr. 10, 2024

(65) Prior Publication Data

US 2024/0362251 A1    Oct. 31, 2024

(30) Foreign Application Priority Data

Apr. 27, 2023 (CN) .......................... 202310472520.1

(51) Int. Cl.
*G06F 16/20* (2019.01)
*G06F 16/27* (2019.01)

(52) U.S. Cl.
CPC .................................. *G06F 16/27* (2019.01)

(58) Field of Classification Search
None
See application file for complete search history.

(56) References Cited

U.S. PATENT DOCUMENTS

| | | | | |
|---|---|---|---|---|
| 10,585,752 | B1* | 3/2020 | Chopra | G06F 11/1461 |
| 10,803,152 | B1* | 10/2020 | Page | G06F 21/445 |
| 2014/0379586 | A1* | 12/2014 | Sawyer | G06F 16/168 |
| | | | | 705/301 |

FOREIGN PATENT DOCUMENTS

| | | |
|---|---|---|
| CN | 101945247 | 1/2011 |
| CN | 102227116 | 10/2011 |

* cited by examiner

*Primary Examiner* — Jau Shya Meng
(74) *Attorney, Agent, or Firm* — Michael Ye; Kalos Athena Wang PLLC (57) ABSTRACT

A method and system for automatic deletion of information based on time synchronization and trusted counting is provided, the method including: defining different data structures including configurations in a normalized manner; setting triggering conditions for automatic information deletion, including conditions for automatic deletion based on time synchronization and/or based on trusted counting; maintaining synchrony of the configurations across different domains; and after satisfying the triggering conditions, making an information source domain and/or an information propagation domain perform the automatic information deletion. Considering that existing data deletion mechanisms cannot delete information according to preset retention periods, the present application employs synchrony across system clocks to perform automatic deletion of authorization information under circulation after a certain time period, and further limits a circulation count for information of interest so as to ensure that the information and its copies are all deleted after reaching a preset maximum permittable circulation count.

12 Claims, 4 Drawing Sheets

METHOD AND SYSTEM FOR AUTOMATIC DELETION OF INFORMATION BASED ON TIME SYNCHRONIZATION AND TRUSTED COUNTING

This application claims priority to Chinese Patent Application No. CN 202310472520.1 filed on Apr. 27, 2023, which is hereby incorporated by reference as if fully set forth herein.

BACKGROUND OF THE APPLICATION

Field

The present disclosure relates to information security, and more particularly to a method and system for automatic deletion of information based on time synchronization and trusted counting.

Description of Related Art

The advent of the era of big data has profoundly changed how people live in the world, and brings people both benefits and threats. One of the most concerned issues is that the stunning extension and speed of data propagation put information subjects in the risk of expired retention of their personal information. Retention beyond authorization is seriously undermining information security of the public. This places personal information on the verge of abuse and stresses the need of automatic deletion of information. However, existing systems for information deletion usually fail to provide any timed mechanism for automatic deletion, making expired retention of information and in particular personal information a common concern.

For example, China Patent Publication No. CN102227116B has disclosed a safe local area network management method and a local area network. The method comprises the following steps: a safety terminal sends a deletion file request input by a user to a safety control server, wherein the deletion file request comprises file path and deletion reason; the safety control server acquires file security level information according to the file path, and fills a deletion file list; the safety control server displays and outputs the deletion file list to an administrator, and receives approval result information input by the administrator and writes the information into the deletion file list; the safety terminal sends a deletion approval result check request to the safety control server, the safety control server searches entry of the deletion requester consistent with identification of the safety terminal in the deletion file list and sends information in the entry back to the safety terminal, and the safety terminal displays and outputs the information in the entry to the user. According to the existing technical scheme, file deletion in the local area network may be realized safely.

For example, China Patent Publication No. CN101945247A has disclosed a message sending method and terminal equipment thereof. The method comprises the following steps: reading an entitlement management message (EMM) to be sent in a sending queue, wherein the EMM is generated according to an entitlement or anti-entitlement instruction of a user and comprises safety device identification, product identification and safety time of the EMM; if the determined safety time of the EMM to be sent is greater than the current time, sending the EMM to the terminal equipment; and if the determined safety time of the EMM to be sent is not greater than the current time, deleting the read EMM. By the embodiment of the disclosure, when the front end sends EMM data packets, the overdue EMM can be automatically deleted, and the redundant data can be reduced; and under the triggering condition of ensuring that the terminal equipment can receive the EMM data packets, the overdue EMM data packets are not sent, thereby relieving the processing load of the front end, saving the network resources and improving the sending speed of data packets.

None of these prior examples provides limitation to the circulation count of information based on trust, leaving information subject to breach or disclosure during circulation.

The present application attempts to provide a method and system for automatic deletion of information based on time synchronization and trusted counting that address the shortcomings of the existing art.

Since there is certainly discrepancy between the existing art comprehended by the applicant of this patent application and that known by the patent examiners and since there are many details and disclosures disclosed in literatures and patent documents that have been referred by the applicant during creation of the present application not exhaustively recited here, it is to be noted that the present application shall actually include technical features of all of these existing works, and the applicant reserves the right to supplement the application with the related art more existing technical features as support according to relevant regulations.

SUMMARY

In view of the shortcomings of the existing art, the present disclosure provides a method for automatic deletion of information based on time synchronization and trusted counting, wherein the method at least comprises: defining different types of data structures in a normalized manner, wherein the data structures at least include configurations; setting triggering conditions for automatic deletion of information, wherein the triggering conditions include conditions for automatic deletion based on time synchronization and/or conditions for automatic deletion based on trusted counting; maintaining synchrony of the configurations; and when information circulation data satisfy the triggering conditions, making an information source domain and/or an information propagation domain perform the automatic deletion of the information.

In order to address the problem of existing data deletion mechanisms about their incapability to delete information according to preset retention periods, the present disclosure employs synchrony across system clocks to perform automatic deletion of authorization information under circulation after lapse of a certain time period and further limits the circulation count of information of interest so as to ensure that the information and its copies are all deleted after a preset maximum permittable count of circulation.

Preferably, the method further comprises: establishing a log deposit to record a process of the automatic deletion.

Preferably, the step of defining different types of data structures in the normalized manner at least comprises: making the information source domain, on basis of information it has acquired, generate corresponding configurations, and when the information is sent to at least one information propagation domain, making the information propagation domain generate a new copy of the information.

Preferably, for the automatic deletion based on time synchronization, the configurations at least include preset deletion time points; and for the automatic deletion based on trusted counting, the configurations at least include a maximum permittable circulation count of the information, and circulation domains of the information.

Preferably, the triggering conditions for automatic deletion based on time synchronization at least comprises: when a predetermined expiration time is identical to a global system time of the information that has been confirmed by time synchronization across the domains, making the domains automatically delete the information; and the triggering conditions for automatic deletion based on trusted counting at least comprises: when a circulation count of the information is equal to the predetermined maximum permittable circulation count, making the domains automatically delete the information.

Preferably, the step of, when the information circulation data satisfy the triggering conditions, making the information source domain and/or the information propagation domain synchronize the configurations and automatically delete the information at least comprises: for the automatic deletion of the information based on time synchronization, when circulation of the information is generated by the information source domain $D_0$, making the information source domain $D_0$ query a location of the current copy from a propagation chain P and synchronize the configuration $C_0$ to the information propagation domain. During clocking, the query to propagation chain P is only made for the information coming from the source domain $D_0$. In the case of from N−1 to N, the configuration is sent directly from $D_{n-1}$ to $D_n$, and no query in the source domain $D_0$ is made. When the copy is circulated again, a new copy $I_n$ is generated in the information propagation domain $D_n$, and the corresponding configuration $C_n$ is synchronously generated. When the global system time T reaches the predetermined expiration time t, and the triggering conditions for automatic deletion are thus satisfied, automatic deletion of the information and all its copies will be accomplished.

Preferably, the step of, when the information circulation data satisfy the triggering conditions, making the information source domain and/or the information propagation domain synchronize the configurations and automatically delete the information at least comprises: with automatic deletion of the information based on trusted counting, when a copy $I_m$ in one of the domains is circulated to the information propagation domain $D_n$, generating a new copy $I_n$ in the information propagation domain $D_n$, and simultaneously generating the corresponding configuration $C_n$, wherein the configuration $C_n$ is updated with a circulation count r−n, and the information propagation domain $D_n$ is added to the information circulation domain F; making the information propagation domain $D_n$ send the new configuration $C_n$ to the information source domain $D_0$, making the information source domain $D_0$ query locations $\{D_0, D_1, \ldots, D_{n-1}\}$ of all the copies $\{I_0, I_1, \ldots, I_{n-1}\}$ through the propagation chain P, and perform synchronization of the configurations, so as to update the circulation count in the configurations corresponding to copies in the other domains into r−n, and to add the information propagation domain $D_n$ to the information circulation domain F; and when the circulation count in the counting configuration is zeroed, triggering the conditions for automatic deletion, so that the corresponding information and its copies are all automatically deleted. Preferably, no matter which domain generates a new copy, the copy information is first sent back to the source domain because the propagation chain P can only be accessed by the source domain. Then other domain updates and synchronizes the configurations with the help of the source domain.

Preferably, the step of establishing the log deposit to record the automatic deletion process at least comprises: generating process data structure information during circulation of the information; generating triggering data structure information after the information satisfies the automatic deletion triggering conditions, and after the information is deleted automatically, storing the corresponding process data structure and/or triggering data structure information as an operation log.

The present disclosure further provides a system for automatic deletion of information based on time synchronization and trusted counting, the system at least comprising a first processor and a second processor, wherein the first processor is about defining different types of data structures in a normalized manner, wherein the data structures at least include configurations; and the first processor is about setting triggering conditions for automatic deletion of information, wherein the triggering conditions include conditions for automatic deletion based on time synchronization and/or conditions for automatic deletion based on trusted counting; wherein synchrony of the configurations is maintained between the first processor and the second processor; and when information circulation data satisfy the triggering conditions, an information source domain in the first processor and/or an information propagation domain in the second processor performs automatic deletion of the information.

Preferably, the first processor or second processor establishes a log deposit to record a process of the automatic deletion.

The disclosed system for automatic deletion of information based on time synchronization and trusted counting serves to unify configurations of different domains and monitor circulation and automatic deletion of information based on time synchronization or trusted counting, thereby preventing information abuse and achieving secured information use.

DETAILED DESCRIPTION

The present disclosure will be further detailed below with reference to accompanying drawings and particular embodiments.

The present application provides a method and system for automatic deletion of information based on time synchronization and trusted counting. The present application further provides a method and system for management of information security.

Some technical terms used in the disclosure have the following definitions.

A signature algorithm is an algorithm used for digital signatures. A digital signature is an alphanumeric string that can only be generated by a sender of information of interest and cannot be fabricated by others. This alphanumeric string is also an effective proof of authenticity of the information sent by the sender. A digital signature is an alphanumeric string that is obtained by processing information to be sent using a one-way function and is used to verify the source of the information and verify whether the information has any change during its transmission.

An information source domain refers to the information domain where the information subject first retains information of interest.

An information propagation domain refers to the information domain which stores the information of interest.

An information circulation domain refers to the information domain where the information of interest has reached during its circulation.

A timestamp is an integral set data that can be authenticated, and is used to indicate that a certain set of data has existed since a certain time point.

A circulation list associated with an information source domain refers to a list of the domains that have been reached by the information, during its circulation, recorded in the domain where the information subject first retained the information.

The present disclosure is here explained with reference to a kind of information for example.

The process of automatic deletion is initiated by the fact that information of interest satisfies a certain set of conditions that triggers automatic deletion, and then specific operations of automatic deletion are conducted to delete relevant data. As such, triggering automatic deletion of information and performing automatic deletion of information jointly form the complete process of automatic deletion of information.

As to automatic deletion, the fact that information copies are circulated across multiple domains makes it difficult to achieve complete deletion as desired by users or stipulated by laws. Therefore, the present disclosure uses both an automatic deletion mechanism upon expiration based on time synchronization and an automatic deletion mechanism based on trusted counting to trigger automatic deletion of information. When the retention time for information of interest exceeds a stipulated time limit or the circulation count exceeds a stipulated count limit, deletion is triggered and performed automatically, so as to ensure that user information and all its copies are circulated across different domains within the stipulated retention time or in the stipulated circulation scope.

Figure 2:
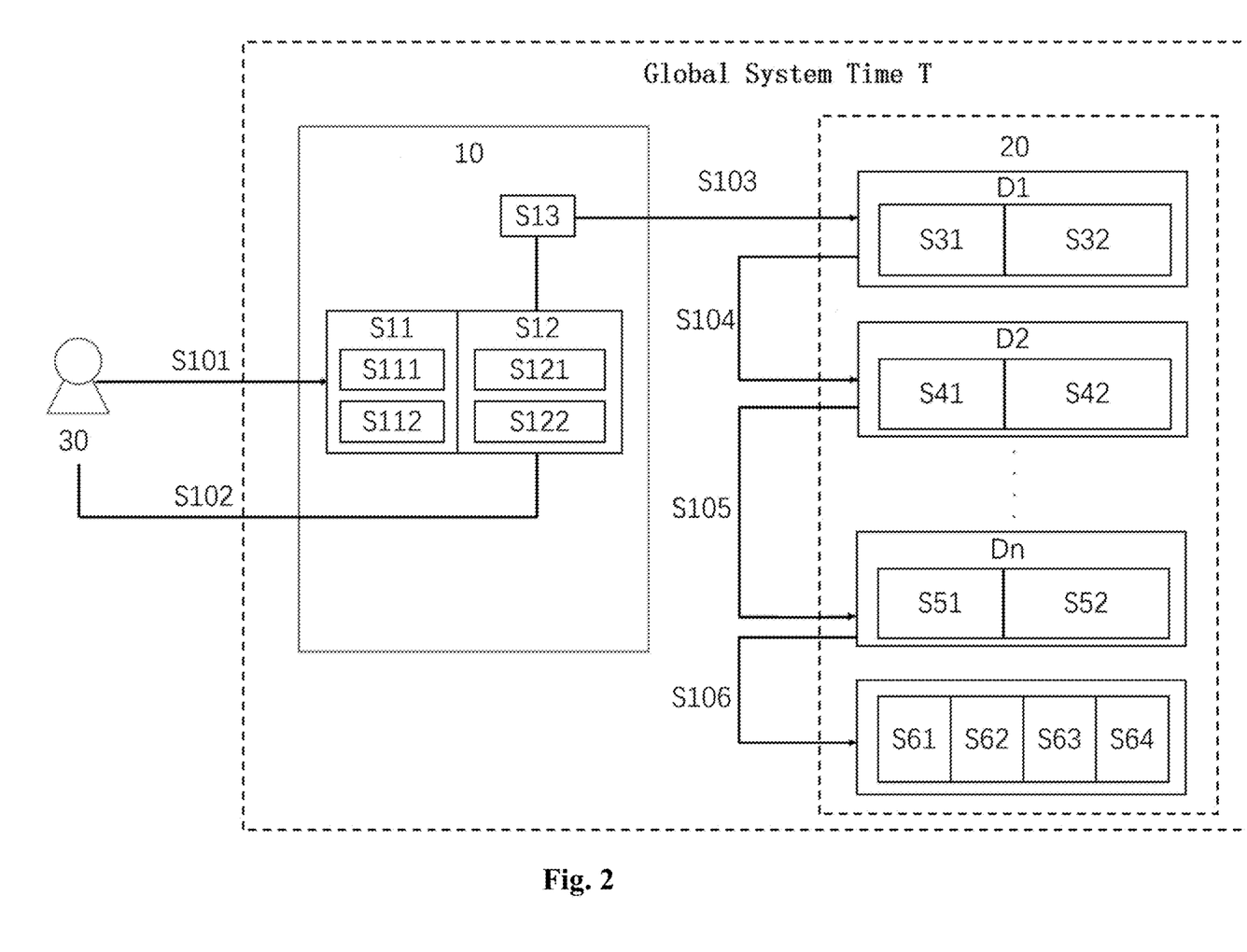
FIG. 2 is a diagram illustrating automatic deletion of information upon expiration based on time synchronization according to a preferred mode of the present disclosure.

The disclosed system for automatic deletion of information based on time synchronization and trusted counting at least comprises at least one first processors 10, at least one second processors 20 and at least one clients 30. As shown in FIG. 2, the first processors 10 and the clients 30 are communicated with each other in a wired and/or wireless manner. The first processors 10 and the second processors 20 are communicated with each other in a wired and/or wireless manner. In the present disclosure, the first processors 10, the second processors 20 and the clients 30 are all equipped with at least one communication component for information transmission. Such a communication component may be a wired communication component and/or a wireless communication component. A wired communication component may be an optical-fiber communication component, a network cable, etc. A wireless communication component may be a Wi-Fi communication component, a Bluetooth communication component, a ZigBee communication component, etc.

In the present disclosure, a first processor 10 is a processor capable of being connected to and receiving information of interest from one or more clients 30, whereas a second processor 20 is a processor used to circulate the information.

In the present disclosure, a processor refers to a device capable of implementing at least one step of the method for automatic deletion of information based on time synchronization and trusted counting of the present disclosure, such as an ASIC, a CPU, a server, etc.

In the present disclosure, a client refers to a terminal from which a user inputs information of interest. The terminal may be, for example, a smart terminal. Such a smart terminal may be, for example, a smartphone, a computer, a tablet, a smart watch, smart glasses, an interaction-enabled display.

In the present disclosure, the system for automatic deletion of information based on time synchronization and trusted counting is for performing the disclosed method for automatic deletion of information based on time synchronization and trusted counting.

Figure 1:
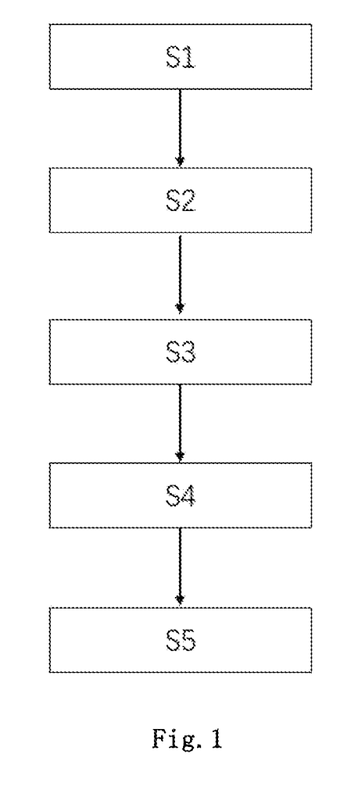
FIG. 1 is a flowchart of a preferred mode of the present disclosure.

As shown in FIG. 1, the disclosed system for automatic deletion of information based on time synchronization and trusted counting performs a method for automatic deletion of information based on time synchronization and trusted counting of the present disclosure. The method comprises the following steps.

At S1, configurations are set.

When information of interest I reaches an information source domain $D_0$, configurations are made. Assuming that the maximum retention time required by relevant rules is $T_{max}$, and the expiration time set by the information subject is $T_u$, the information source domain $D_0$ compares $T_{max}$ and $T_u$ to designate the smaller one as the maximum retention time in the actual configurations, and set the expiration time $t=\min(T_{max},T_u)+T_c$, where $T_c$ is the global system time upon configuration. Additionally, the information source domain $D_0$ adds a timestamp $T_s$ to the configurations. The configuration includes the expiration time $t$ and the timestamp $T_s$.

At S2, information is sent and the signature is authenticated.

Before sending the information I and the configurations to the first information propagation domain $D_1$, the information source domain $D_0$ signs them and generates a final signature-certificate pair (v,s). The information I, the configurations, and the signature-certificate pair (v,s) are synchronously sent to the first information propagation domain $D_1$. The first information propagation domain $D_1$ authenticates the signature using a signature authenticate algorithm. If the signature (v,s) is authenticated as valid, it means that the received information was really signed by the sender, i.e., the source domain $D_0$, and the authenticity is highly trusted. This proves that the information I and the configurations have not been tampered, and are valid information, so the domain $D_1$ stores the received information I and configurations.

At S3, synchronizing configuration information.

If the triggering conditions are based on trusted counting, after the information I is sent from the information source domain $D_0$ to the information propagation domain $D_{i+1}$, the information circulation count changes from r−i to r−i−1. The information circulation domain set changes from $F=\{D_0, D_1, \ldots, D_i\}$ into $F=\{D_0, D_1, \ldots, D_i, D_{i+1}\}$ as the information circulation domain $D_{i+1}$ is added. In order to maintain consistence of configurations, the circulation domain $D_{i+1}$ in the second processor sends new configurations to the personal information propagation domains $D_0$, $D_1, \ldots, D_i$ in the first processors and second processors so as to synchronize the configurations to all the circulation domains.

At S4, deletion is triggered.

According to the mechanism of time synchronization, when the expiration time t and the global system time $T_c$ become consistent, all of the domains perform deletion synchronously, so as to ensure that the data of the information subject are only used in the stipulated time period.

According to the mechanism of trusted counting, after the counting information is zeroed, all of the domains perform deletion synchronously, so as to ensure that the total circulation count of the information across the domains does not exceed the value preset by the information subject or the value stipulated by laws.

At S5, the log is stored.

In addition to all circulated information, the first processor 10 and/or the second processor 20 further retains the signature every domain generates when circulating the information to the next domain and the signature authenticated for information reception as a log for record.

Embodiment 1

The present embodiment disclosed the process of automatic deletion based on time synchronization.

At S101, at least one client 30 sends information of interest to the first processor 10. The information may at least include the identifier, the name, the ID number, the telephone number, the address and other information of an information subject.

At S102, time-based automatic deletion is configured.

While the client 30 sends the information to the first processor 10, configurations such as the deletion target and the deletion time are displayed to the user, so that the user makes configurations such as the deletion target and the deletion time through the client 30, thereby accomplishing setting of timed automatic deletion.

In response to reception of the information, the first processor 10 is configured to: set configurations and triggering conditions related to automatic deletion.

When the information I reaches the information source domain $D_0$, corresponding configurations are made. The configuration includes an expiration time t and a timestamp $T_s$.

At S11, different types of data structures are defined in a normalized manner. For example, these may include automatic deletion configurations, communication modes, and circulation lists of information source domains. The kinds of data structures at least include the information subject identifier UserID, the information expiration time t, the information circulation count r, the time $t_s$ when automatic deletion is set, the information retention domain $D_s$ where automatic deletion is configured, the time $t_e$ when automatic deletion is triggered, the information retention domain $D_s$ where automatic deletion is triggered, the expiration time t set for automatic deletion, the information circulation count r set for automatic deletion, w entries of process information, and the log generating time $t_D$.

At S111, after the information subject submits the information $I_0$ in the information source domain $D_0$, the information source domain $D_0$ traces the information $I_0$. That is, when the information is circulated, configurations are made synchronously, and a circulation list for the information source domain is generated in the information source domain $D_0$. When the information is circulated to information propagation domains $\{D_1, D_2, \ldots, D_{n-1}\}$, new copies $\{I_1, I_2, \ldots, I_{n-1}\}$ are generated.

At S112, after the information subject sets automatic deletion for the information $I_0$ in the information source domain $D_0$, the information source domain $D_0$ generates corresponding configuration $C_0$. For automatic deletion upon expiration based on time synchronization, the configuration $C_0$ includes a preset expiration time t. For automatic deletion based on trusted counting, it includes a maximum permittable circulation count r of the information and circulation domains F of the information.

At S12, triggering conditions for automatic deletion are set.

After triggering conditions for automatic deletion are set, the triggering conditions information is stored in the configurations. When the triggering conditions are satisfied, the first processor 10 and the second processors 20 connected thereto all automatically conduct deletion.

Assuming that the maximum retention time required by relevant rules is $T_{max}$, and the expiration time set by the information subject is $T_u$, the information source domain $D_0$ compares $T_{max}$ and $T_u$ to designate the smaller one as the maximum retention time in the actual configurations, and set the expiration time $t=\min(T_{max},T_u)+T_c$, where $T_c$ is the global system time upon configuration. The configuration at least includes the expiration time t and the timestamp $T_s$.

At S121, an initial triggering condition, namely the expiration time t, is set.

At S122, for automatic deletion upon expiration based on time synchronization, the configuration $C_0$ includes the preset expiration time t. T is the global system time confirmed by synchronization across domains. When t=T, automatic deletion is triggered and deletion is conducted.

Without the foregoing configurations, it is impossible to trigger automatic deletion. The configurations not only enable automatic deletion across domains, but also ensure currency of automatic deletion.

At S13, configurations for automatic deletion by means of global synchrony are made. When the information is circulated across domains, synchrony is conducted for every time of circulation to synchronize the configurations to all circulation domains, thereby ensuring consistence of the configurations for automatic deletion.

At S103 is about first circulation and/or synchronization of the configurations and the signature authentication information.

Before sending the information I and the configurations to the first information propagation domain $D_1$, the first processor 10 signs them and generates a final signature-certificate pair (v,s).

The first processor 10 sends the information I, the configurations, and the signature-certificate pair (v,s) synchronously to all information propagation domains of the second processor 20.

For example, the first processor 10 sends the information I, the configurations, and the signature-certificate pair (v,s) synchronously to a first information propagation domain $D_1$ of the second processor 20. The first information propagation domain $D_1$ authenticates the signature using a signature authenticate algorithm. If the signature (v,s) is authenticated as valid, it means that the received information was really signed by the sender, i.e., the source domain $D_0$, and the authenticity is highly trusted. This proves that the information I and the configurations have not been tampered, and are valid information, so the domain $D_1$ stores the information I and the configurations.

Specifically, a DSA signature algorithm is detailed herein as an example for explaining the signature scheme used in the present disclosure.

The signature algorithm has five parameters, i.e., p, q, g, x, and y, where p, q, g are integers; (x,y) is a secret key pair. p is a prime modulus whose value satisfies: $2^{L-1} < p < 2^L$, where L is a fold of 64, and satisfies 512<L<1024; q is the prime factor of (p−1) and its value satisfies $2^{159} < q < 2^{160}$, which means that q is 160-bit in length; g has a value of $h^{(p-1)/q}$ mod p, where h is any integer satisfying 1<h<p−1, thereby $h^{(p-1)/q}$ mod p>1; x is the private key, and is an integer generated randomly or pseudo-randomly, whose value satisfies 0<x<q; y is the public key, and has a value of $g^x$ mod p. Therein, the integers p, q, g may be public or may be shared among a group of certain users. The private key x and the public key y form a secret key pair (x,y). The private keys can only be held by the signer itself. The public key may be released to the public, and the secret key pair remains usable in a time period.

The signature process yields a random number k, whose value satisfies 0<k<q. Two signatures r and s are calculated. k is generated for every signature, so that a same k cannot be repeatedly used in calculation of signature. Therein, $r=(g^k$ mod p)mod q), whose value satisfies r>0; $s=(k^{-1}(H(M)+xr))$ mod q, whose value satisfies s>0, where $k^{-1}$ represents an inverse element of integer k with respect to a certain modulus, not a reciprocal of k. At last, the signature-certificate pair (r,s) is generated and sent to the authenticator party along with M.

In the authenticate signature process, for authenticating whether the signature of (r, s, M) is made by the sender, the authenticator needs to have (g, p, q, y). If authentication succeeds, it indicates that the signature (r,s) is valid, which means that (r, s, M) is indeed the signed result from the sender, and the authenticity is highly trusted. This proves that M has not been tampered and is valid information. If authentication fails, it indicates that the signature (r,s) is invalid, which means that (r, s, M) is not reliable or M has been tampered or the signature is fake or the signature for M is problematic. Thus, M is determined as invalid.

Specifically, authentication of the signature comprises the following sub-steps:

$$\text{calculating } w = s^{-1} \bmod q;$$

$$\text{calculating } u_1 = (H(M) * w) \bmod q;$$

$$\text{calculating } u_2 = (r * w) \bmod q; \text{ and}$$

$$\text{calculating } v = (g^{u_1} * g^{u_2}) \bmod p) \bmod q.$$

If v is equal to r the authentication succeeds. Otherwise, the authentication fails. If the signature does not pass the authentication, the receiver may directly reject the data to prevent tampered or damaged data from entering the system.

Without authentication of the signature, problems about data integrity, trustability, security and auditability can raise and make it hard to detect and address abnormal data, which in turn increase security risks threatening the system and degrade reliability of the transmitted data.

The foregoing authentication of the signature advantageously protects data integrity, and enables authentication, provenance and audit of data, prevents man-in-the-middle attacks, and facilities detection and processing of abnormal data, thereby enhancing system security, reliability and compliance.

S31 is about, after receiving the information, the first information propagation domain $D_1$ generates a new copy $I_1$.

At S32, for automatic deletion upon expiration based on time synchronization, when information of interest is circulated from the information source domain $D_0$, the information source domain $D_0$ queries the location of the current copy from the propagation chain P and synchronizes the configurations $C_0$ to the information propagation domain. All configurations $\{C_1, C_2, \ldots, C_{n-1}\}$ synchronized with the copy are the same, so they all contain the same expiration time t. When the copy is circulated again, a new copy $I_n$ is generated in the information propagation domain $D_n$, while a corresponding configuration $C_n$ is generated synchronously.

When the information is circulated across different domains and retention is performed, if the retention time reaches the preset time, automatic deletion is conducted as the relevant automatic deletion condition is satisfied.

To be specific, after the information is circulated to and retained in the first information propagation domain $D_1$, when the retention time reaches the preset time, automatic deletion is conducted as the relevant automatic deletion condition is satisfied.

S104 is about the second circulation and/or synchronization of configurations and signature authentication information.

At S41, after receiving the information, the second information propagation domain $D_2$ generates a new copy $I_2$.

The information propagation domain $D_1$ synchronizes the configurations $C_1$ to the second information propagation domain $D_2$. All configurations $\{C_0, C_1, C_2\}$ synchronized with the copy are the same, so they all contain the same expiration time t.

At S42, after the information is circulated to and retained in the second information propagation domain $D_2$, if the retention time reaches the preset time, automatic deletion is conducted as the relevant automatic deletion condition is satisfied.

S105 is about the $N^{th}$ circulation and/or synchronization of configurations and signature authentication information.

S51: after receiving the information, the $N^{th}$ information propagation domain $D_n$ generates a new copy $I_n$.

The $(N-1)^{th}$ information propagation domain $D_{n-1}$ synchronizes the configurations $C_{n-1}$ to the $N^{th}$ information propagation domain $D_n$. All the configurations $\{C_1, C_2, \ldots, C_{n-1}\}$ synchronized with the copy are the same, so they all contain the same expiration time t.

S52: after the information is circulated to and retained in the $N^{th}$ propagation domain $D_n$, if the retention time reaches the preset time, automatic deletion is conducted as the relevant automatic deletion condition is satisfied.

Preferably, the process that if the retention time reaches the preset time, automatic deletion is conducted as the relevant automatic deletion condition is satisfied is achieved through:

When the global system time T reaches the agreed deletion time t, automatic deletion is triggered, and the information as well as its all copies will be deleted automatically.

At S106, preferably, after the propagation domains in the second processor 20 delete information copies and configurations, they further perform log deposit for the entire automatic deletion process.

Therein, establishment of deposit related to the automatic deletion process comprises the following steps.

At S61, after the information satisfies the triggering conditions for automatic deletion, a triggering data structure is generated. The triggering data structures at least include the information subject identifier UserID, the current time $t_e$, and the current information retention domain $D_e$.

At S62, in the process of information circulation, a process data structure is generated. The process data structure at least includes the identifier UserID of the information subject and w sets of process information, where w is the count of circulation of the information. In other words, every time the information is circulated, an entry of process information is generated, and every entry of the process information contains the deletion-triggering time $t_p$, and the information retention domain $D_p$ where deletion is triggered.

At S63, after an entry of information undergoes the entire automatic deletion process, the first processor 10 stores the corresponding data structure information as an operation log.

At S64, in the operation log for automatic deletion, the data structure at least includes the information subject identifier UserID, the information expiration time t, the information circulation count r, the time $t_s$ when automatic deletion is set, the information retention domain $D_s$ where automatic deletion is configured, the time $t_e$ when automatic deletion is triggered, the information retention domain $D_s$ where automatic deletion is triggered, the expiration time t set for automatic deletion, the information circulation count r set for automatic deletion, w entries of process information, and the log generating time $t_D$.

Without establishment of such a log, issues may raise such as difficult troubleshooting and debugging, inferior security auditing and monitoring, limited performance analysis and optimization, poor business analysis and decision-making, and substandard legal compliance.

Establishment of the log helps remedy the foregoing issues and thus has positive impact on the system in terms of reliability, security, performance and compliance.

Embodiment 2

The present embodiment 2 is a further improvement on Embodiment 1, and repeated details are omitted descriptions herein.

Figure 3:
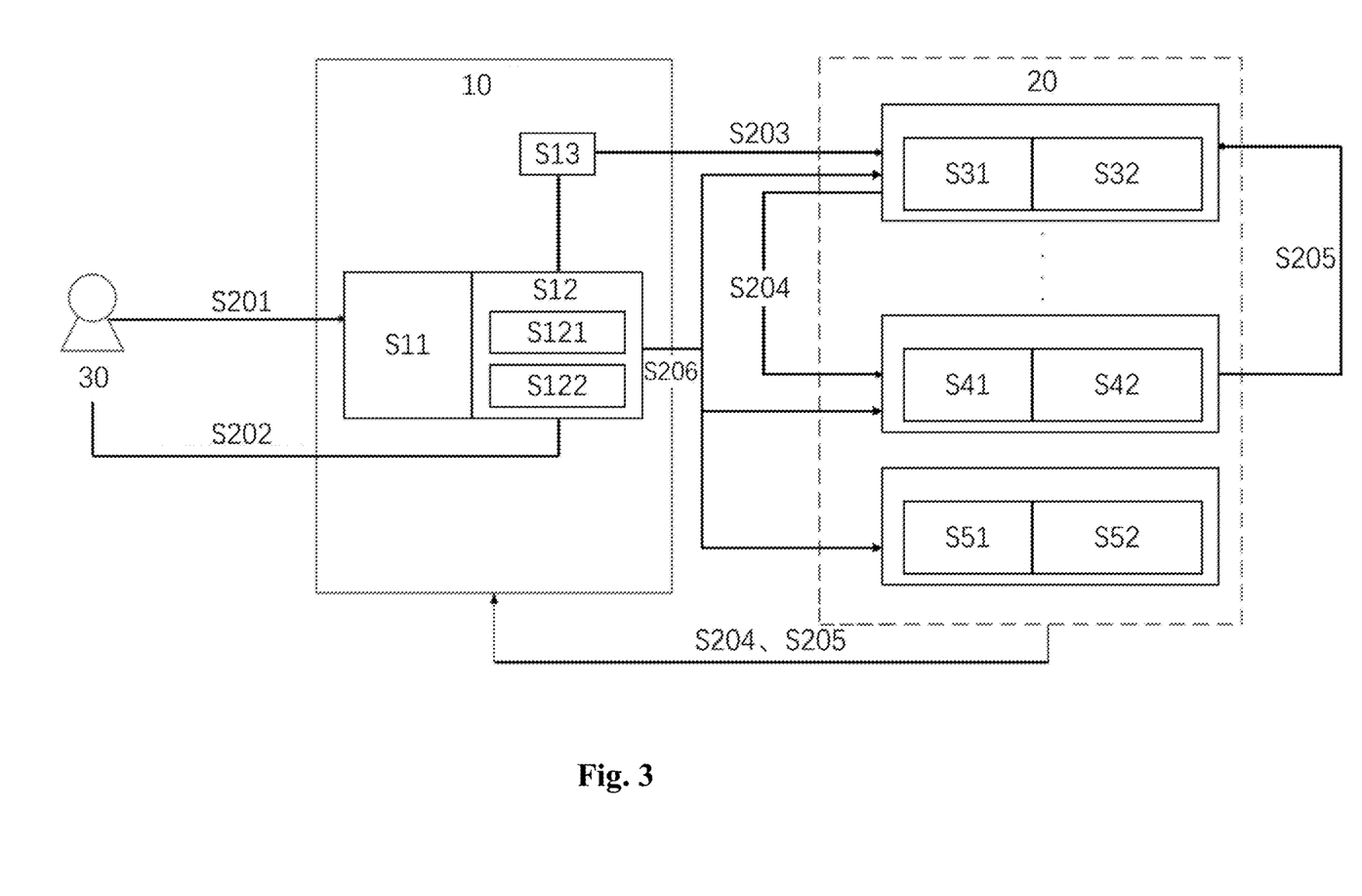
FIG. 3 is a diagram illustrating the $i^{th}$ circulation based on trusted counting according to a preferred mode of the present disclosure.

FIG. 3 illustrates the process of the $i^{th}$ circulation based on trusted counting according to the present disclosure. The specific circulation steps are as below.

At S201, at least one client 30 sends information of interest to the first processor 10.

When sending the information to the processor 10, the client 30 also sets configurations such as the deletion target and the maximum circulation count, so that count-based automatic deletion is configured.

At S202, count-based automatic deletion is configured.

In response to reception of the information, the first processor 20 is configured to: set configurations and triggering conditions for automatic deletion.

When the information I reaches the information source domain $D_0$, configurations are made. The configuration includes the maximum circulation count r and the circulation domains F of the information.

S11 involves defining different types of data structures in a normalized manner.

At S12, triggering conditions for automatic deletion are set.

At S121, an initial triggering condition is set by setting a valid circulation count r.

At S122, for automatic deletion based on trusted counting, the configuration $C_0$ includes a maximum permittable circulation count r of the information and the circulation domains F of the information. When the count of circulation reaches r, automatic deletion is triggered and conducted.

At S13, configurations for automatic deletion by means of global synchrony are made. When the information is circulated across domains, synchrony is conducted for every time of circulation to synchronize the configurations to all circulation domains, thereby ensuring consistence of the configurations for automatic deletion.

S203 is about the first circulation and/or synchronization of configurations and signature authentication information.

Before sending the information I and the configurations to the first information propagation domain $D_1$, the first processor 10 signs them and generates the final signature-certificate pair (v,s).

The first processor 10 sends the information I, the configurations, and the signature-certificate pair (v,s) synchronously to all information propagation domains of the second processor 20. The first processor 10 sends the information I, the configurations, and the signature-certificate pair (v,s) synchronously to the first information propagation domain $D_1$ of the second processor 20. The first information propagation domain $D_1$ authenticates the signature using a signature authenticate algorithm. If the signature (v,s) is authenticated as valid, it means that the received information was really signed by the sender, i.e., the source domain $D_0$, and the authenticity is highly trusted. This proves that the information I and the configurations have not been tampered, and are valid information, so the domain $D_1$ stores them.

At S31, after receiving the information, the first information propagation domain $D_1$ generates a new copy $I_1$.

At S32, automatic deletion based on trusted counting is conducted as below.

The information source domain $D_0$ queries the locations of all the current copies from the propagation chain P and synchronizes the configurations $C_0$ to the corresponding domains. For example, the information source domain $D_0$ queries the locations of all the current copies from the propagation chain P and synchronizes the configurations $C_0$ to the first information propagation domain $D_1$.

When the information is circulated across different domains and retention is performed, if the circulation count reaches the preset maximum permittable circulation count, automatic deletion is conducted as the relevant automatic deletion condition is satisfied.

To be specific, after the information is circulated to and retained in the first information propagation domain $D_1$, if the circulation count reaches the preset maximum permittable circulation count, automatic deletion is conducted as the relevant automatic deletion condition is satisfied.

S204 is about the second circulation and/or synchronization of configurations and signature authentication information.

S41: after receiving the information, second information propagation domain $D_2$ generates a new copy $I_2$.

The information source domain $D_0$ queries the locations of all the current copies from the propagation chain P and synchronizes the configurations $C_0$ to the second information propagation domain $D_2$. As a new copy is generated, the circulation count changes accordingly. All the domains have to update the configurations synchronously. All the configurations have the same count r−2+1=r−1, and the same circulation domain F as $\{D_0, D_1, D_2\}$.

At S42, after the information is circulated to and retained in the second information propagation domain $D_2$, if the circulation count reaches the preset maximum permittable circulation count, automatic deletion is conducted as the relevant automatic deletion condition is satisfied.

S205 is about the $N^{th}$ circulation and/or synchronization of configurations and signature authentication information.

At S51, after receiving the information, the $N^{th}$ information propagation domain $D_n$ generates a new copy $I_n$.

In the $N^{th}$ information propagation domain $D_n$, a new copy $I_n$ is generated, and the corresponding configurations $C_n$ is generated. $C_n$ contains the circulation count of r−n, and the element $D_n$ is also added into the information circulation domain F. As a new copy is generated, the circulation count changes, and all the domains have to update the configurations synchronously so that all the configurations have the same count of r−n, and have $D_n$ added into the circulation domains F.

At S206, the information propagation domain $D_n$ sends the new configuration $C_n$ to the information source domain $D_0$. The information source domain $D_0$ queries the locations $\{D_0, D_1, \ldots, D_{n-1}\}$ of all the copies $\{I_0, I_1, \ldots, I_{n-1}\}$ through the propagation chain P, and performs synchronization of the configurations, so as to update the circulation count in the configurations corresponding to copies in the other domains into r−n, and the information propagation domain $D_n$ is added as an additional information circulation domain F. Thereby, the configurations $\{C_1, C_2, \ldots, C_{n-1}\}$ corresponding to the other copies $\{I_0, I_1, \ldots, I_{n-1}\}$ all have the circulation count changed to r−n, and the information circulation domain F added with $D_n$.

S52: after the information is circulated to and retained in the $N^{th}$ information propagation domain $D_n$, if the circulation count reaches the preset maximum permittable circulation count, automatic deletion is conducted as the relevant automatic deletion condition is satisfied.

Preferably, if the circulation count reaches the preset maximum permittable circulation count, automatic deletion is conducted as the relevant automatic deletion condition is satisfied. This process is achieved as below.

When the copy $I_m (1 \leq m \leq n-1)$ of some domain is again circulated to the $N^{th}$ information propagation domain $D_n$, a new copy $I_n$ is generated in the $N^{th}$ information propagation domain $D_n$, and the corresponding configuration $C_n$ is also generated. $C_n$ contains the circulation count of r−n, and the domain $D_n$ is also added into the information circulation domain F. Meanwhile, the information propagation domain $D_n$ sends the new configuration $C_n$ to the information source domain $D_0$. The information source domain $D_0$ queries the locations $\{D_0, D_1, \ldots, D_{n-1}\}$ of all the copies $\{I_0, I_1, \ldots, I_{n-1}\}$ through the propagation chain P, and performs synchronization of the configurations, so as to update the circulation count in the configurations corresponding to copies in the other domains into r−n, and the information propagation domain $D_n$ is added as an additional information circulation domain F. No matter which domain generates a new copy, the configurations are first sent back to the source domain because the propagation chain P can only be accessed by the source domain. Then the source domain updates and synchronizes the configurations. Thereby, the configurations $\{C_1, C_2, \ldots, C_{n-1}\}$ corresponding to the other copies $\{I_0, I_1, \ldots, I_{n-1}\}$ all have the circulation count changed to r−n, and the information circulation domain F added with $D_n$.

Whenever a copy is circulated, the count configurations are synchronized in this manner, and when the circulation count in the count configurations is zeroed, automatic deletion is triggered, so that the corresponding information and all its copies will be deleted automatically.

Embodiment 3

The present embodiment 3 is a further improvement on Embodiment 1 or Embodiment 2, and repeated details are omitted descriptions herein.

Figure 4:
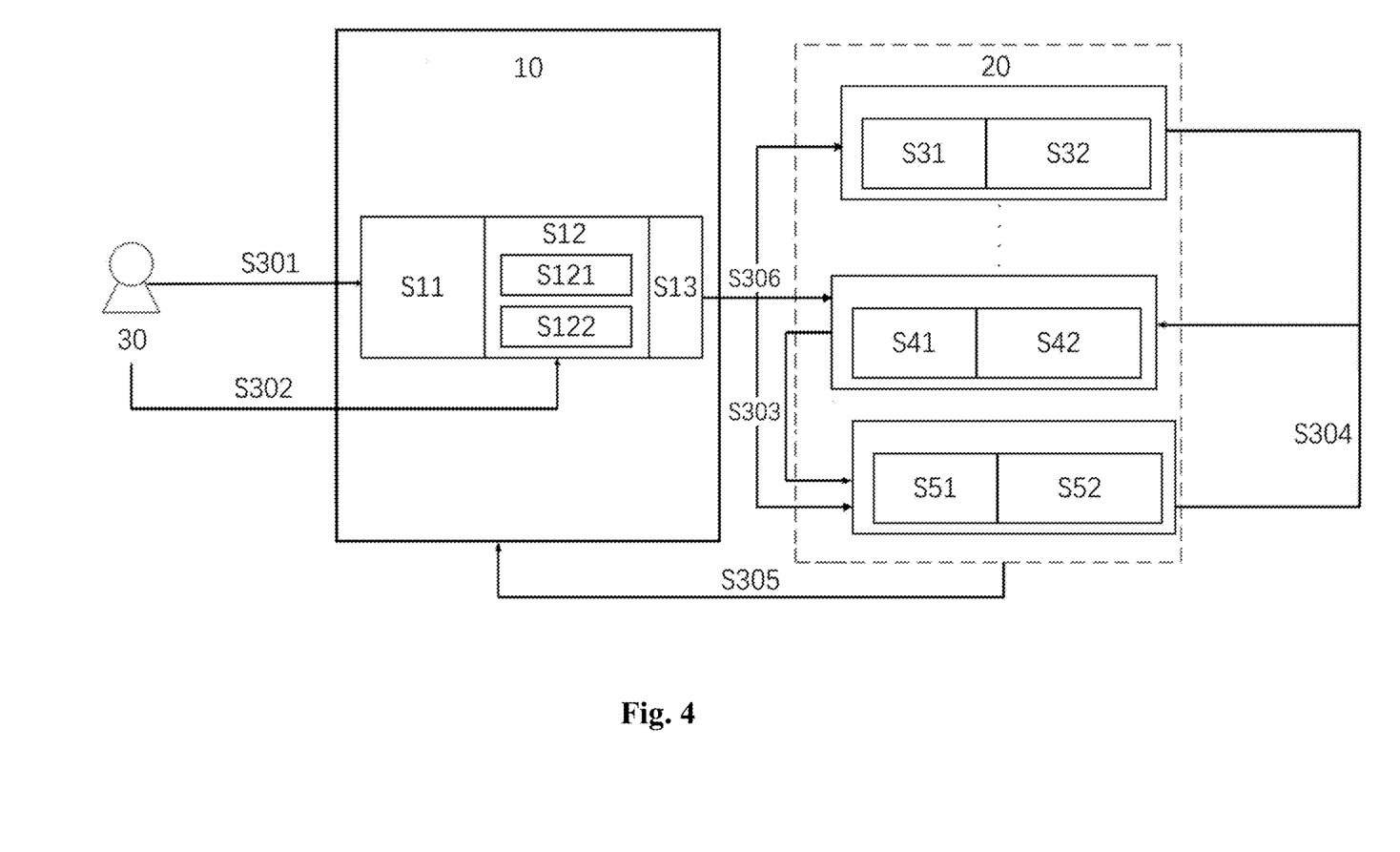
FIG. 4 is a diagram illustrating the $(i+1)^{th}$ circulation based on trusted counting according to a preferred mode of the present disclosure.

FIG. 4 illustrates the process of the $(i+1)^{th}$ circulation based on trusted counting according to the present disclosure.

At S301: at least one client 30 sends information of interest to the first processor 10.

At S302, count-based automatic deletion is configured.

In response to reception of the information, the first processor 20 is configured to: set configurations and triggering conditions for automatic deletion.

When the information I reaches the information source domain $D_0$, configurations are made. The configuration includes the maximum permittable circulation count r and the circulation domains F of the information.

S11 involves defining different types of data structures in a normalized manner.

At S12, triggering conditions for automatic deletion are set.

S121: an initial triggering condition is set by setting a valid circulation count r.

At S122, for automatic deletion based on trusted counting, the configuration $C_0$ includes a maximum permittable circulation count r of the information and the information circulation domains F. When the count of circulation reaches r, automatic deletion is triggered and conducted.

At S13, configurations for automatic deletion by means of global synchrony are made. When the information is circulated across domains, synchrony is conducted for every time of circulation to synchronize the configurations to all circulation domains, thereby ensuring consistence of the configurations for automatic deletion.

S303 is about the $(i+1)^{th}$ circulation and/or synchronization of configurations and signature authentication information.

Before sending the information I and the configurations from the information propagation domain $D_i$ to another information propagation domain $D_{i+1}$, the information propagation domain $D_i$ signs them and generates the final signature-certificate pair (v,s). The information propagation domain $D_{i+1}$ authenticates the signature using a signature authenticate algorithm. If the signature (v,s) is authenticated as valid, it means that the received information was really signed by the sender, i.e., the information propagation domain $D_i$, and the authenticity is highly trusted. This proves that the information I and the configurations have not been tampered, and are valid information, so the domain $D_{i+1}$ stores them.

The $(i+1)^{th}$ information propagation domain $D_{i+1}$ sends the configurations to domains $\{D_0, D_1, \ldots, D_i\}$ where other copies are in.

S51: after receiving the information, the $(i+1)^{th}$ information propagation domain $D_{i+1}$ generates a new copy $I_{i+1}$.

At S52, automatic deletion based on trusted counting is conducted as below.

The information source domain $D_0$ queries the locations of all the current copies from the propagation chain P and synchronizes the configuration $C_0$ to all domains. All of the configurations have to be updated. For example, the information source domain $D_0$ queries the locations of all the current copies from the propagation chain P and synchronizes the configuration $C_0$ to the $(i+1)^{th}$ information propagation domain $D_{i+1}$. At this time, in other domains, configurations for the information are $\{C_1, C_2, \ldots, C_{n-1}\}$. All configurations have the same count of r−i−1, and the same circulation domains F of $\{D_0, D_1, \ldots, D_{i+1}\}$.

To be specific, after the information is circulated to and retained in the $(i+1)^{th}$ information propagation domain $D_{i+1}$, if the circulation count reaches the preset maximum permittable circulation count, automatic deletion is conducted as the relevant automatic deletion condition is satisfied.

S304 is about the second circulation and/or synchronization of configurations and signature authentication information. For example, the $(i+1)^{th}$ information propagation domain $D_{i+1}$ circulates and/or synchronize configurations and signature authentication information to the $i^{th}$ information propagation domain $D_i$, . . . , first information propagation domain $D_1$.

The information source domain $D_0$ queries the locations of all the current copies from the propagation chain P and synchronizes the configurations $C_0$ to all propagation domains. All configurations have the same count of r−i−1, and the same circulation domains $F=\{D_0, D_1, \ldots, D_i\}$.

Preferably, if the circulation count reaches the preset maximum permittable circulation count, automatic deletion is conducted as the relevant automatic deletion condition is satisfied. This process is achieved as below.

When the copy $I_i$ ($1 \leq i \leq n-1$) of the information propagation domain $D_i$ is again circulated to the $(i+1)^{th}$ information propagation domain $D_{i+1}$, in the $(i+1)^{th}$ information propagation domain $D_{i+1}$, a new copy $I_{i+1}$ is generated, and the corresponding configuration $C_{i+1}$ is also generated. $C_{i+1}$ contains the circulation count of r−i−1, and the element $D_{i+1}$ is also added into the information circulation domain F. Whenever a copy is circulated, the count configurations are synchronized in this manner, all the domains have to update the configurations synchronously, and when the circulation count in the count configurations is zeroed, automatic deletion is triggered, so that the corresponding information and all its copies will be deleted automatically.

At S306, the information propagation domain $D_{i+1}$ also sends the new configuration $C_{i+1}$ to the information source domain $D_0$. The information source domain $D_0$ queries the locations $\{D_0, D_1, \ldots, D_{n-1}\}$ of all the copies $\{I_0, I_1, \ldots, I_{n-1}\}$ through the propagation chain P and performs synchronization of the configurations, so as to update the circulation count in the configurations corresponding to copies in the other domains into r−i−1, and the information propagation domain $D_{i+1}$ is added as an additional information circulation domain F. Thereby, the configurations $\{C_1, C_2, \ldots, C_i\}$ corresponding to the other copies $\{I_0, I_1, \ldots, I_i\}$ all have the circulation count changed to r−i−1, and the information circulation domain F added with $D_{i+1}$.

S42: after the information is circulated to and retained in the $i^{th}$ information propagation domain $D_i$, if the circulation count reaches the preset maximum permittable circulation count, automatic deletion is conducted as the relevant automatic deletion condition is satisfied.

At S305, the second processor 20 feeds the configurations and the signature authentication information to the information source domain $D_0$ in the first processor 10, so that the information source domain $D_0$ updates the circulation count and the circulation domains.

As compared to automatic deletion based on time synchronization, automatic deletion based on trusted counting has the following advantages:

The first advantage is precise control. For automatic deletion based on trusted counting, different deletion strategies may be set for different types of data. For example, the deletion cycle may be set depending on the sensitivity, importance or legal compliance requirements of the data.

The second advantage is good data security. Automatic deletion based on trusted counting helps protect data security. By timely deleting data not in use, unnecessary breach and disclosure can be minimized, thereby reducing related risks.

The third advantage is automated management. Automatic deletion based on trusted counting enables automated data management. By monitoring and counting data access and use, data deletion can be triggered automatically. This effectively reduce workload for manual management and improves efficiency of data management.

As compared to automatic deletion based on time synchronization, automatic deletion based on trusted counting allows more precise control and superior in terms of data security and automated management, making it more suitable for more complicated and diverse needs for data management.

Additionally, in the present disclosure, automatic deletion based on time synchronization and automatic deletion based on trusted counting can work together. If the both are deployed, the one triggered earlier is performed first.

It is to be noted that the particular embodiments described previously are exemplary. People skilled in the art, with inspiration from the disclosure of the present disclosure, would be able to devise various solutions, and all these solutions shall be regarded as a part of the disclosure and protected by the present disclosure. Further, people skilled in the art would appreciate that the descriptions and accompanying drawings provided herein are illustrative and form no limitation to any of the appended claims. The scope of the present disclosure is defined by the appended claims and equivalents thereof. The disclosure provided herein contains various inventive concepts, such of those described in sections led by terms or phrases like "preferably", "according to one preferred mode" or "optionally". Each of the inventive concepts represents an independent conception and the applicant reserves the right to file one or more divisional applications therefor.

What is claimed is:

1. A method for automatic deletion of information based on time synchronization and trusted counting, the method at least comprising:
   implementing via a processor with a memory for instructions, wherein the processor performs the following steps:
   defining different types of data structures in a normalized manner, wherein the data structures at least include configurations;
   setting triggering conditions for automatic deletion of information, wherein the triggering conditions include conditions for automatic deletion based on the time synchronization and/or conditions for automatic deletion based on the trusted counting;
   maintaining synchrony of the configurations across different domains; and
   satisfying the triggering conditions based on information circulation data;
   making an information source domain and/or an information propagation domain perform the automatic deletion of the information;
   establishing a log deposit to record a process of the automatic deletion; and
   wherein the step of defining the different types of data structures in the normalized manner at least comprises:
      making the information source domain, on basis of information it has acquired, generate corresponding configurations, and
      sending the information to at least one information propagation domain, making the information propagation domain generate a new copy of the information; and wherein for the automatic deletion based on the time synchronization, the configurations at least include preset deletion time points; and for the automatic deletion based on trusted counting, the configurations at least include a maximum permittable circulation count of the information, and circulation domains of the information, wherein the triggering conditions for automatic deletion based on the time synchronization at least comprises:
confirming by the time synchronization across domains a predetermined expiration time identical to a global system time of the information;
making the domains automatically delete the information; and wherein the triggering conditions for automatic deletion based on the trusted counting at least comprises:
equalizing a circulation count of the information to the predetermined maximum permittable circulation count; and
making the domains automatically delete the information.

2. The method of claim 1, wherein the step of,
satisfying the triggering conditions based on information circulation data; and
making the information source domain and/or the information propagation domain synchronize the configurations and automatically delete the information at least comprises:
for the automatic deletion of the information based on the time synchronization,
generating by the information source domain $D_0$ circulation of the information, making the information source domain $D_0$ query a location of the current copy from a propagation chain P and synchronize the configuration $C_0$ to the information propagation domain;
circulating the copy again, generating a new copy $I_n$ in the information propagation domain $D_n$, and synchronously generating the corresponding configuration $C_n$; and
satisfying the triggering conditions for automatic deletion based on the global system time T reaching the predetermined expiration time t, and accomplishing automatic deletion of the information and all its copies.

3. The method of claim 2, wherein the step of,
satisfying the triggering conditions based on information circulation data; and
making the information source domain and/or the information propagation domain synchronize the configurations and automatically delete the information at least comprises:
with automatic deletion of the information based on the trusted counting,
circulating a copy $I_m$ in one of the domains to the information propagation domain $D_n$ again, generating a new copy $I_n$ in the information propagation domain $D_n$, and simultaneously generating the corresponding configuration $C_n$, wherein the configuration $C_n$ is updated with a circulation count r−n, and the information propagation domain $D_n$ is added to the information circulation domain F;
making the information propagation domain $D_n$ send the new configuration $C_n$ to the information source domain $D_0$, making the information source domain $D_0$ query locations $\{D_0, D_1, \ldots, D_{n-1}\}$ of all the copies $\{I_0, I_1, \ldots, I_{n-1}\}$ through the propagation chain P, and performing synchronization of the configurations, so as to update the circulation count in the configurations corresponding to copies in the other domains into r−n, and to add the information propagation domain $D_n$ to the information circulation domain F; and
zeroing the circulation count in the counting configuration, initiating the conditions for automatic deletion, so that the corresponding information and its copies are all automatically deleted.

4. The method of claim 3, wherein the step of establishing the log deposit to record the automatic deletion process at least comprises:
generating process data structure information during circulation of the information;
generating triggering data structure information after the information satisfies the automatic deletion initiating conditions, and
after the information is deleted automatically, storing the corresponding process data structure and/or triggering data structure information as an operation log.

5. The method of claim 4, wherein the data structures include the information subject identifier UserID, an information expiration time t, an information circulation count r,
setting automatic deletion at the time $t_s$, an information retention domain $D_s$ where automatic deletion is configured, triggering the automatic deletion at the time $t_e$, the information retention domain $D_s$ where automatic deletion is triggered, an expiration time t set for automatic deletion, an information circulation count r set for automatic deletion, w entries of process information, and a log generating time $t_D$.

6. The method of claim 5, wherein the method further comprises:
after the information subject submits the information $I_0$ in the information source domain $D_0$, the information source domain $D_0$ traces the information $I_0$;
circulating the information, the configurations are made synchronously, and a circulation list for the information source domain is generated in the information source domain $D_0$; the information is circulated to information propagation domains $\{D_1, D_2, \ldots, D_{n-1}\}$, new copies $\{I_1, I_2, \ldots, I_{n-1}\}$ are generated.

7. A system for automatic deletion of information based on time synchronization and trusted counting, the system at least comprising
a first processor and a first memory to store first instructions, wherein the first instructions are executed by the first processor to perform;
a second processor and a second memory to store second instructions, wherein the second instructions are executed by the second processor to perform, wherein
the first processor defining different types of data structures in a normalized manner, wherein the data structures at least include configurations; and
the first processor setting triggering conditions for automatic deletion of information, wherein the triggering conditions include conditions for automatic deletion based on the time synchronization and/or conditions for automatic deletion based on the trusted counting;
wherein synchrony of the configurations is maintained between the first processor and the second processor; and
satisfying the triggering conditions based on information circulation data;
an information source domain in the first processor and/or an information propagation domain in the second processor performs automatic deletion of the information;

wherein the first processor or the second processor establishes a log deposit to record a process of the automatic deletion;

wherein the step of defining the different types of data structures in the normalized manner at least comprises:

making the information source domain, on basis of information it has acquired, generate corresponding the configurations, and sending the information to at least one information propagation domain, making the information propagation domain generate a new copy of the information; and wherein for the automatic deletion based on the time synchronization, the configurations at least include preset deletion time points; and for the automatic deletion based on trusted counting, the configurations at least include a maximum permittable circulation count of the information, and circulation domains of the information, wherein the triggering conditions for automatic deletion based on the time synchronization at least comprises:

confirming by the time synchronization across domains a predetermined expiration time is identical to a global system time of the information, making the domains automatically delete the information; and the triggering conditions for automatic deletion based on the trusted counting at least comprises:

equalizing a circulation count of the information to the predetermined maximum permittable circulation count, and making the domains automatically delete the information.

8. The system of claim 7, wherein the step of, satisfying the triggering conditions based on information circulation data; making the information source domain and/or the information propagation domain synchronize the configurations and automatically delete the information at least comprises:

for the automatic deletion of the information based on the time synchronization, generating circulation of the information by the information source domain $D_0$, making the information source domain $D_0$ query a location of the current copy from a propagation chain P and synchronize the configuration $C_0$ to the information propagation domain;

circulating the copy again, generating a new copy $I_n$ in the information propagation domain $D_n$, and synchronously generating the corresponding configuration $C_n$; and satisfying the triggering conditions for automatic deletion by the global system time T reaching the predetermined expiration time t, and accomplishing automatic deletion of the information and all its copies.

9. The system of claim 8, wherein the step of, satisfying the triggering conditions based on information circulation data;

making the information source domain and/or the information propagation domain synchronize the configurations and automatically delete the information at least comprises:

with automatic deletion of the information based on the trusted counting, circulating a copy $I_m$ in one of the domains to the information propagation domain $D_n$ again, generating a new copy $I_n$ in the information propagation domain $D_n$, and simultaneously generating the corresponding configuration $C_n$, wherein the configuration $C_n$ is updated with a circulation count r−n, and the information propagation domain $D_n$ is added to the information circulation domain F;

making the information propagation domain $D_n$ send the new configuration $C_n$ to the information source domain $D_0$, making the information source domain $D_0$ query locations $\{D_0, D_1, \ldots, D_{n-1}\}$ of all the copies $\{I_0, I_1, \ldots, I_{n-1}\}$ through the propagation chain P, and performing synchronization of the configurations, so as to update the circulation count in the configurations corresponding to copies in the other domains into r−n, and to add the information propagation domain $D_n$ to the information circulation domain F; and zeroing the circulation count in the counting configuration, and initiating the conditions for automatic deletion, so that the corresponding information and its copies are all automatically deleted.

10. The system of claim 9, wherein the step of establishing the log deposit to record the automatic deletion process at least comprises:

generating process data structure information during circulation of the information;

generating triggering data structure information after the information satisfies the automatic deletion initiating conditions, and after the information is deleted automatically, storing the corresponding process data structure and/or triggering data structure information as an operation log.

11. The system of claim 10, wherein the data structures include an information subject identifier UserID, an information expiration time t, setting at automatic deletion an information circulation count r, the time $t_s$, an information retention domain $D_s$ where automatic deletion is configured, triggering automatic deletion at the time $t_e$, the information retention domain $D_s$ where automatic deletion is triggered, the expiration time t set for automatic deletion, the information circulation count r set for automatic deletion, w entries of process information, and the log generating time $t_D$.

12. The system of claim 11, wherein after the information subject submits the information $I_0$ in the information source domain $D_0$, the information source domain $D_0$ traces the information $I_0$;

circulating the information, so the configurations are made synchronously, and a circulation list for the information source domain is generated in the information source domain $D_0$; circulating the information to information propagation domains $\{D_1, D_2, \ldots, D_{n-1}\}$, so new copies $\{I_1, I_2, \ldots, I_{n-1}\}$ are generated.

* * * * *